Figure 2:
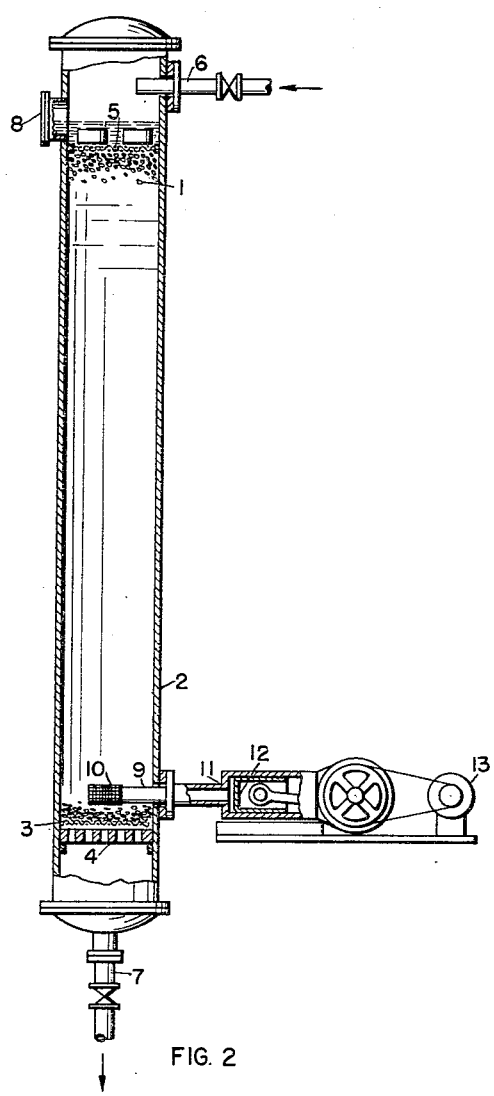

May 31, 1955    N. E. PEERY    2,709,643
CONTACTING LIQUIDS WITH SOLIDS
Filed Sept. 20, 1954    2 Sheets-Sheet 1
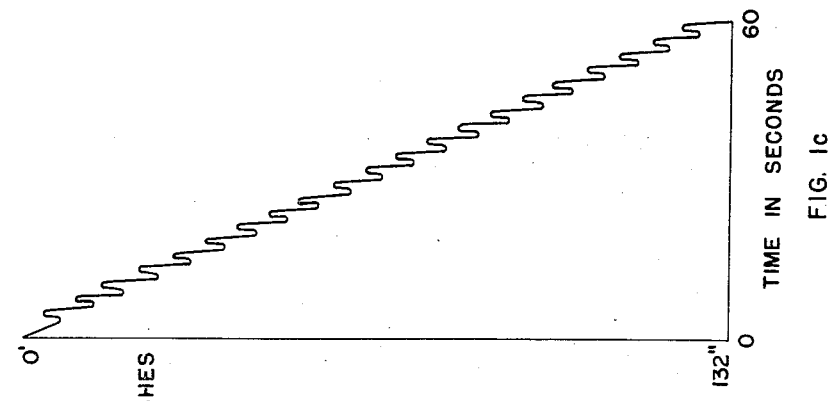
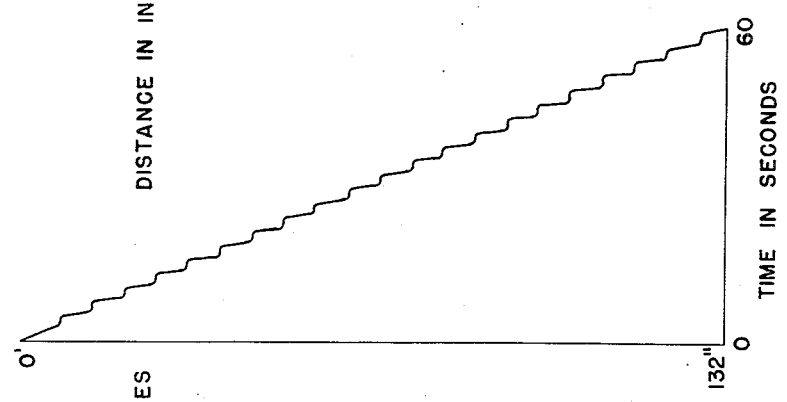
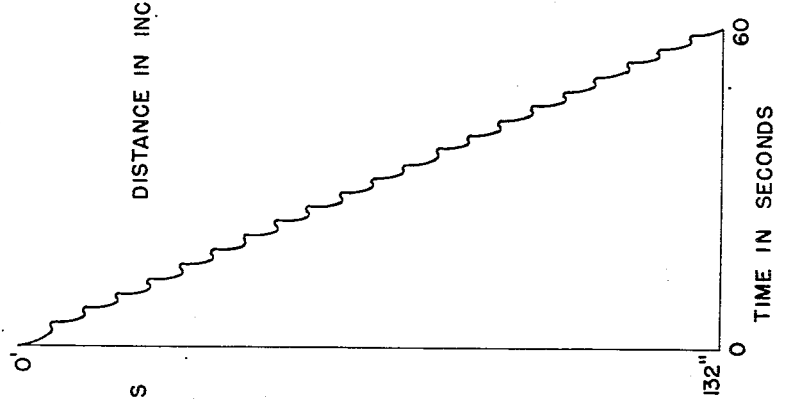
INVENTOR:
NORMAN E. PEERY
BY:
HIS ATTORNEY May 31, 1955 — N. E. PEERY — 2,709,643
CONTACTING LIQUIDS WITH SOLIDS
Filed Sept. 20, 1954 — 2 Sheets-Sheet 2

INVENTOR:
NORMAN E. PEERY
BY: *James Todorovic*
HIS ATTORNEY

United States Patent Office 2,709,643
Patented May 31, 1955

2,709,643

CONTACTING LIQUIDS WITH SOLIDS

Norman E. Peery, San Francisco, Calif., assignor to Shell Development Company, New York, N. Y., a corporation of Delaware Application September 20, 1954, Serial No. 457,069

2 Claims. (Cl. 23—311)

This invention relates to an improved method for contacting liquids with solids. One aspect of the invention relates to the treatment of a liquid or liquids with a solid treating agent such, for example, as a solid cation exchange resin.

In many processes in many fields, it is necessary to treat a liquid with a solid such as a solid cation exchange resin, a catalyst, an adsorbent, or the like. In such cases, the intimacy of contact of the liquid with the solid is an important factor.

Several methods for effecting the contact are used. One method is to suspend the solid in the agitated liquid in a tank, coil, or other suitable apparatus, and then after a period of time to separate the solid from the liquid by filtration, decantation, or other known ways. This method is quite suitable in some cases but has the disadvantage of (1) requiring batch-wise or intermittent operation; and/or (2) requiring separation equipment which is often costly; and/or (3) affording only a low ratio of solid to liquid; and/or (4) affording a contact time of the solid only equal to that of the liquid.

The last mentioned disadvantages can be overcome by continuously passing the liquid through a foraminous bed of the solid. Here a high ratio of solid to liquid can be maintained and the contact time of the solid may be made as long as desired without affecting the contact time of the liquid. The foraminous bed of the solid, e. g., a bed of lumps, fragments, or pellets, may be stationary, or by the application of suitable known means the bed of the solid may be continuously or continually replaced by the addition of increments of fresh solid and withdrawal of like increments of contacted solid. The liquid to be contacted with the solid may completely flood the bed and may pass through the bed either upwardly, downwardly, or horizontally. However, in these methods the contact is quite poor and, consequently, the bed of solid must be large and the flow of the liquid must be quite low. These conditions lead to channeling and relatively inefficient contact. The difficulty due to channeling and inefficient contact can be lessened to some extent by trickling the liquid down over the solid in such a manner that the liquid flows as a film over the surface of the solid pieces. However, the flow rate in this case is low and, in order to provide a reasonable capacity, beds of large cross-section are generally required.

Since the contact is relatively inefficient in these methods where the liquid is passed through the bed of the solid, it is the usual practice to over-design in these cases, i. e., to increase the size of the bed rather than to try to improve the efficiency. Consequently, plants designed for such operation generally require large and costly equipment. Such plants are particularly costly where high pressure equipment or corrosion resistant equipment is involved. Also, the cost of the required greater amount of solid may be considerable. For example, the additional platinum catalyst in the contacting zone, as well as that held available for replacement, may represent a capital outlay of many thousands of dollars in a single contacting unit.

According to the present invention, the liquid to be contacted is passed substantially continuously through a substantially flooded stationary bed of the solid while a minor portion of the liquid is continually reciprocated between a plenum and the contact zone in such a manner that the superficial linear velocity of flow of the liquid or liquids is alternately above and below the mean or normal flow as represented by the amount of liquid charged to and withdrawn from the contacting apparatus. By operating in this manner, the efficiency of contact is increased and the tendency of the liquid to channel is decreased. Consequently, smaller, less costly apparatus may be used and the amount of solid required may be decreased.

In the process of the invention the solid is contacted while in the form of a fixed foraminous bed. By a fixed bed is meant a bed in which the particles of the solid are stationary, as distinguished from a bed in which the solid is agitated, e. g., by paddles, force of liquid flow, or the like. It is to be understood, however, that the bed may be a so-called moving bed, i. e., a bed which is substantially fixed but is slowly replaced by the continuous or intermittent addition of increments of fresh solid to one end and the withdrawal of a like amount of contact solid from the other end.

The solid may be in the form of irregular pieces, or formed pieces such as balls, rings, cylinders, saddles, or the like, of like or unlike size. It is preferred that the pieces be relatively coarse, i. e., at least ⅛ inch diameter. Generally pieces of about ¼ inch up to about 2 inches will be used.

In the method of operation, the liquid or liquids may pass upwardly through the bed or downwardly through the bed but the bed is retained in a flooded condition, i. e., the level of liquid is maintained near or above the top of the bed. A gas or a second liquid may be passed through the bed concurrently or countercurrently to the liquid. In such cases, the second phase does not pass freely as the continuous phase but bubbles up through the liquid.

A liquid to be treated is fed to one end of the bed and is withdrawn from the other end at an equal and substantially constant rate which may be considered the normal flow rate and may be, for example, 25 gallons per minute. The normal superficial flow velocity, i. e., the calculated linear rate for the normal flow of the liquid through the contacting chamber devoid of solid, may vary considerably depending upon the particle process in question and may, for example, be 4 feet per minute.

In the process of the invention the flow velocity in the fixed bed is alternately increased and decreased to above and below the normal value. This is effected by continually withdrawing a small part of the liquid from the bed and recharging it thereto. The point of this withdrawal and recharging should be near the bottom of the fixed bed.

Three different flow patterns may be obtained depending upon the rate of withdrawing and recharging the mentioned small amount of liquid from and to the bed. If the rate of recharging is equal to the normal flow rate, the liquid, i. e., each incremental part thereof, is caused to flow through the bed in a series of short spurts with intermediate periods of substantially no flow. This type of flow is illustrated graphically in Figure 1a of the attached drawing. Referring to Figure 1a, the length of travel through the fixed bed is indicated on the ordinate and the time in seconds is indicated on the abscissa. It will be noted that there is little flow during approximately half of the time whereas during the remaining half of the time the flow rate is approximately twice the normal flow rate.

If the rate of recharging is less than the normal flow rate, the liquid, i. e., each incremental part thereof, is caused to flow through the fixed bed in a series of alternate spurts of low and high velocity. This flow pattern is illustrated graphically in Figure 1b of the drawing, which is believed to be self-explanatory. Referring to Figure 1b it will be seen that in this case the liquid flows continually forward at two different velocities.

If the rate of recharging is greater than the normal flow rate, the liquid, i. e., each incremental part thereof, is caused to flow through the bed in alternate spurts of forward and back motion at higher and lower velocities, respectively. This condition, which may be likened to marching two steps forward and one step backward, gives the best contact. This flow pattern is illustrated diagrammatically in Figure 1c. It will be noted that in this case the actual distance that each increment of the liquid travels in passing through the length of the bed of the solid is considerably greater than the length of the bed.

In other words, in the case where the liquid is passed downwardly through the bed of the solid, the flow velocity is increased as the small portion of the liquid is withdrawn from the column; when this liquid is recharged to the column the flow rate in the column is slowed down, halted, or reversed, depending upon the rate at which the liquid is recharged. In cases where the liquid is passed upwardly through the bed, the normal rate is slowed down, halted, or reversed as the small part of the liquid is withdrawn and the rate is increased as this same liquid is recharged. In any case, each increment of the liquid is subjected to numerous changes in flow rate during its passage through the column.

The method of the invention will be further illustrated in connection with the description of a suitable apparatus. One suitable apparatus for obtaining the desired contact is illustrated in Figure 2 of the accompanying drawing. The apparatus is shown partly in vertical section. This apparatus may be one of a series of similar apparatuses and may be used for the separation of individual rare earths from solutions of their mixtures by cation exchange.

Referring to Figure 2 the cation exchange resin 1 in the form of small granules (about ⅛ inch) is disposed as a fixed, relatively long, narrow column, e. g., 23 inches diameter by 11 feet tall, in a cylindrical shell 2. The bed of exchange resin rests upon a screen 3 of such fineness that the resin particles are retained above the screen. The screen is supported by a perforated plate 4. A weighted screen 5 rests on top of the bed to prevent any movement of the top granules. The solution of mixed rare earth salts is slowly introduced at a controlled rate near the top of the apparatus by line 6. The exchanged solution is slowly withdrawn at a substantially constant rate through the screen 3, perforated plate 4, and line 7. The rate of withdrawal of the solution via line 7 is regulated such that the column is flooded with liquid. The liquid level at any time may be seen in the sight glass 8. The level of the liquid is held below the top of the apparatus to allow a small surge space as illustrated.

A separate line 9 for removing and recharging liquid from and to the column is located within the bed at a short distance above the screen and perforated plate. The end of line 9 is provided with a screen 10 to prevent the resin from entering the line. Line 9 leads to a plenum which in the case illustrated is the cylinder 11. A piston 12 is provided in the cylinder and is arranged to be reciprocated at the desired rate and with the desired length of stroke by the prime mover 13. By operation of the piston a small portion of the liquid is withdrawn from the column near the bottom and then this same portion is recharged to the column at the same point to provide the contact as described above.

The action of the piston may be adjusted to provide a suitable frequency of charge and discharge. By way of example, a time of 1 to 6 seconds per cycle is generally most suitable. If a too rapid recharging rate is applied, the surge of liquid may cause the entire bed to lift in the vessel. This is undesirable and is to be avoided since it causes severe bumping, rapid erosion of the solid material, and less uniform contact.

The volume of the liquid reciprocated is determined by the size of the cylinder and the length of the stroke of the piston. The volume will not be more than about 25% of the volume of the liquid in the column and is generally much less than this amount. This volume can easily be made adjustable by utilizing one of the known mechanisms for adjusting the piston stroke.

In the apparatus illustrated in Figure 2 the line 9 is located above the perforated plate 4. This is the preferred location since the pressure drop through the screen 3 and plate 4 tends to prevent unevenness in the flow through the control valve in line 7, i. e., the screen acts as a flow retarder tending to cause the material recharged from the plenum to flow back up the column instead of down through line 7. In some cases where pulsations in the discharge is not objectionable, or where the rate of flow in line 7 is well throttled, the line 9 may be placed below the perforated plate.

The relative flow rates in the interior of the column during the charge and discharge periods of the cycle depend upon the size of the column, as well as upon the rate of charge and discharge to and from the plenum. These are adjusted as described above by controlling the rate of charge and discharge to and from the plenum.

In the operation wherein the liquid during its passage through the column is caused to periodically reverse its direction of flow, a backflow of about 1 to 6 inches is quite suitable. Greater or lesser backflow may be preferred in some cases and can be applied provided that the backflow is insufficient to raise or disrupt the bed.

In the apparatus illustrated and described a simple cylinder fitted with a piston is used. This is the simplest device. It is understood that the invention is not limited to this particular arrangement but embraces other equivalent mechanical arrangements for effecting the described reciprocation of liquid between the column and a suitable plenum. For example, a chamber provided with a moving diaphragm may be substituted for the cylinder with piston.

While the invention has been described as applied to the separation of rare earths from the solutions of their mixtures by cation exchange, it will be apparent that the process is suitable for other applications where it is desired to contact one or more liquids with a solid material. Thus, for example, the invention is suitable for application in various chromatographic separations. Other contemplated applications are in certain catalytic processes, e. g., the liquid phase isomerization of hydrocarbon oils with a solid platinum-aluminum fluoride catalyst, in processes for the treatment of oils or other lquids with solid desiccants, absorbents, decolorizing, or bleaching agents. In these and similar applications the liquid is treated with the solid by contact therewith. The invention is also suitable for processes in which a solid is treated with one or more liquids or two liquids are contacted with the solid. In such processes a more complicated but known moving bed arrangement may be substituted for the simple fixed bed arrangement illustrated. A contemplated application in this latter category is the elutriation or regeneration of exchange bodies used in the described exchange separation. The washing of fresh gels such as silica gel, alumina gel, or silica-alumina composite gels to remove traces of alkali salts is another example.

This application is a continuation-in-part of copending application, Serial No. 215,119, filed March 12, 1951, now abandoned.

I claim as my invention:

1. In a process for continuously contacting a liquid with a solid which comprises continuously passing a liquid to be contacted at a substantially constant rate through a fixed foraminous bed of the solid, the improvement which comprises continuously withdrawing contacted liquid passed through said bed at such a rate as to maintain said bed continuously flooded with said liquid while maintaining a vapor space above the liquid level, continuously reciprocating a portion of said liquid passing through said bed between a point near the bottom of said bed and a separate plenum, effecting said reciprocation of liquid to and from said bed and plenum at a rate of from about 10 to about 60 cycles per minute to impart to each increment of the liquid a plurality of pulses during its passage through said bed while maintaining the rates of withdrawing and recharging of liquid to and from said bed in the reciprocation cycles below those causing any movement of the solid particles in said bed.

2. In a process for continuously contacting a liquid with a solid which comprises continuously passing a liquid to be contacted at a substantially constant rate through a fixed foraminous bed of the solid, the improvement which comprises continuously withdrawing contacted liquid passed through said bed at such a rate as to maintain said bed continuously flooded with said liquid while maintaining a vapor space above the liquid level, continuously reciprocating a portion of said liquid passing through said bed between a point near the bottom of said bed and a separate plenum, effecting said reciprocation of liquid to and from said bed and plenum at a rate of from about 10 to about 60 cycles per minute to impart to each increment of the liquid a plurality of pulses during its passage through said bed while maintaining the rates of withdrawing and recharging of liquid to and from said bed in the reciprocation cycles below those causing any movement of the solid particles in said bed, and regulating the quantity of liquid reciprocated such as to impart in the liquid column a liquid flow between 1 and 6 inches per pulse cycle.

No references cited.